United States Patent [19]

Haacke et al.

[11] 4,400,365

[45] Aug. 23, 1983

[54] METHOD FOR THE MANUFACTURE OF ALUMINUM ZINC PHOSPHATE HYDRATES OR BASIC ALUMINUM ZINC PHOSPHATE HYDRATES

[75] Inventors: Wigo Haacke; Gerhard Adrian, both of Goslar; Manfred Gawol, Clausthal-Zellerfeld; Rainer Heubach, Goslar, all of Fed. Rep. of Germany

[73] Assignees: Goslarer Farbenwerke, Langelsheim; Dr. Hans Heubach GmbH & Co. KG, Goslar, both of Fed. Rep. of Germany

[21] Appl. No.: 326,184

[22] Filed: Dec. 1, 1981

[30] Foreign Application Priority Data

Dec. 11, 1980 [DE] Fed. Rep. of Germany ....... 3046698

[51] Int. Cl.$^3$ ...................... C01B 15/16; C01B 25/26
[52] U.S. Cl. .................................... 423/306; 423/305; 423/307; 423/311; 106/14.12
[58] Field of Search ............... 423/304, 305, 306, 307, 423/311, 308, 309; 106/14.12

[56] References Cited

U.S. PATENT DOCUMENTS 4,294,808 10/1981 Wasel-Nielen et al. ............ 423/305
4,346,065 8/1982 Maurer ................................ 423/305

FOREIGN PATENT DOCUMENTS 2655458 6/1977 Fed. Rep. of Germany.
2656779 6/1978 Fed. Rep. of Germany.

OTHER PUBLICATIONS

V. G. Myer, "Vergleiche der Bestandigkeit von Modifizierten Chromat- und Phosphat-Primern auf Eisen", pp. 471-478, 1970.
42J. Ruf, "Unbunte Korrosionsschutzpigmente", Farbe und Lack, vol. 79, No. 1, 1973, pp. 22-27.
*Rompps Chemie-Lexikon,* 1972, pp. 136-137.
Chemical Abstracts, 94:144375, 1981.
Chemical Abstracts, 95:47890, 1981.

*Primary Examiner*—Gregory A. Heller
*Attorney, Agent, or Firm*—Hedman, Casella, Gibson, Costigan, Costigan & Hoare

[57] ABSTRACT

Aluminum zinc phosphate hydrates or basic aluminum zinc phosphate hydrates are manufactured by reacting 1 mole of aluminum hydrogen phosphate with from 2.4 to 4 moles of zinc oxide, if necessary with the addition of up to 0.4 moles of alkali aluminate or the equivalent quantity of alkali hydroxide. A 50% by weight acidic aluminum hydrogen phosphate solution is preferably used for the reaction which is carried out at an elevated temperature in the range from 30° to 80° C. The aluminum zinc phosphate hydrates produced by the method are useful anti-corrosion pigments for use in paints.

11 Claims, No Drawings

METHOD FOR THE MANUFACTURE OF ALUMINUM ZINC PHOSPHATE HYDRATES OR BASIC ALUMINUM ZINC PHOSPHATE HYDRATES

Zinc phosphates belong to the anti-corrosion pigments which, for environmental reasons, are being used to an increasing extent in the place of zinc chromates. Although they are not such good anti-corrosive agents as zinc chromates, they do however form so-called inhibitor complexes on metal surfaces which can be compared with metal treatment layers. The anti-corrosive effect of zinc phosphates is however not adequate in many systems, so that combinations with other pigments have been recommended, for example combinations with zinc oxide, phosphites, or molybdates (E. Meyer, "Fatipec-Kongress-Buch" 1970, pages 471–475 and J. Ruf, "farbe+lack" (color and paint) Vol. 79, No. 1, 1973, pages 22–27). Finally mixed crystals of zinc phosphate with other metal phosphates have been described. For example, DE-PS No. 26 55 458 describes mixed crystals of zinc phosphate and iron phosphate while DE-PS No. 26 56 779 relates to calcium zinc phosphates.

The invention has as its object the provision of anti-corrosion pigments which possess a significantly improved anti-corrosive effect when compared with the above-named pigments.

This object is satisfied by the invention through a method in accordance with the patent claim by means of which aluminum zinc phosphate hydrates or basic aluminum zinc phosphate hydrates with a water of crystallization proportion from 0.5 to 4 moles, in particular 1.5 to 2 moles, are obtained. These are suitable for use as anti-corrosion pigments having a significantly improved anti-corrosive action when compared with known pigments, and are preferably used in paints.

It has been established that these new compounds, in cooperation with the respective binding agent, lead to a significantly improved adhesion of the paint coat onto the metal surface and to a clearly improved anti-corrosive action when compared with zinc phosphate. This may be attributable to the formation of additional adhesion and inhibitor complexes.

A 50% by weight solution of acidic aluminum hydrogen phosphate preferably used for the reaction in accordance with the invention. In doing this, 1 mole of aluminum hydrogen phosphate is reacted with 2.4 to 4 moles zinc oxide and in particular with 3.15 to 3.5 moles zinc oxide. In the case of products which are manufactured by the use of less than 3 moles zinc oxide per 1 mole aluminum hydrogen phosphate, an alkali aluminate, in particular sodium aluminate is added in an amount up to 0.5 moles as an additional source of aluminum. In this manner compounds rich in phosphate result which contain more than 1 mole aluminum phosphate per mole zinc phosphate. The reaction is usefully carried out at an elevated temperature in particular at 30° to 80° C. and preferably and most expediently at 50° C.

Apart from alkali aluminate, in particular sodium aluminate, alkali hydroxide, in particular sodium hydroxide, can also be used for the neutralization of the excess acidic aluminum hydrogen phosphate that is present. Aluminum oxyhydrate can also additionally be introduced into the product by the use of alkali hydroxide.

In detail, the method is usefully carried out as follows: zinc oxide is wetted with or formed into a slurry (or suspension) with water and the acidic aluminum phosphate solution (monoaluminum phosphate solution) and, if required, alkali aluminate in solution, is subsequently added. Depending on the degree of dilution, temperatures from 20° to 80° C. can be reached during the addition of the reaction partners. The mother liquor is separated by filtration, if required it is washed, and the resultant product is dried at 105° C. and ground.

In order to examine the anti-corrosive action, four pigments were chosen from the aluminum zinc phosphate hydrates or basic aluminum zinc phosphate hydrates manufactured in accordance with the invention. These pigments were manufactured by maintaining the following mole ratios of $ZnO/Al(H_2PO_4)$:

|  |  | % $PO_4$ |
| --- | --- | --- |
| Pigment 1 | 2.4:1 | 60.7 |
| Pigment 2 | 3:1 | 56.1 |
| Pigment 3 | 3.15:1 | 55.0 |
| Pigment 4 | 3.33:1 | 53.8 |

These anti-corrosion pigments were tested in comparison with zinc chromate, zinc phosphate, zinc molybdate and zinc oxide.

The tests were carried out in the following paint systems:

1. Priming coat on the basis of modified wood oil/tallolalkyd resin, PVK value from 33 to 37%, proportion of free binding agent 30%, Q=0.7.
2. Priming coat on the basis of epoxide esters with PVK values from 40 to 45%, proportion of free binding agent, Q=0.8.

The anti-corrosion examination was carried out using the salt spray test of DIN (German Industrial Standard) 50021 and in the Kesternich test apparatus of DIN (German Industrial Standard) 50018.

In order to facilitate a direct comparison of the performance of the anti-corrosive pigments, the examination took place with constant proportions of free binding agents.

The criteria for evaluating the corrosion in terms of:
blister formation of the coating in accordance with DIN 53209 loss of adhesion of the coating in accordance with DIN 53151 infiltration at points of injury in accordance with DIN 53167
were summarized by way of so-called evaluation numerals (BWZ):

BWZ 100=very good
BWZ 90–80=good
BWZ 70–60=good to fair
BWZ 50–40=fair
BWZ 30–20=poor
BWZ 10–0=very poor Each test recipe and the results obtained in the salt spray test of DIN 50021 are summarized in the following table:

TABLE

| Test recipes | Binding agent: modified wood oil/tallol-alkyd resin | | | | | | |
|---|---|---|---|---|---|---|---|
| | Parts by weight in % | | | | | | |
| | 1 | 2 | 3 | 4 | 5 | 6 | 7 |
| mod. wood oil/tallol-alkyd resin, 60% | 29.7 | 33.4 | 29.8 | 27.6 | 38.1 | 37.3 | 37.1 |
| zink chromate | 14.9 | — | — | — | — | — | — |
| zink phosphate | — | 15.2 | — | — | — | — | — |
| zinc oxide | — | — | 23.0 | — | — | — | — |
| zink molybdat | — | — | — | 20.5 | — | — | — |
| basic aluminum zinc phosphate hydrate 1 | — | — | — | — | 12.4 | — | — |
| basic aluminum zinc phosphate hydrate 2 | — | — | — | — | — | 13.2 | — |
| basic aluminum zinc phosphate hydrate 3 | — | — | — | — | — | — | 13.0 |
| modified montmorillonite as gelling agent 10% | 2.6 | 2.5 | 2.5 | 2.5 | 2.5 | 2.5 | 2.3 |
| titanium dioxide | 4.2 | 4.9 | 4.3 | 4.3 | 4.3 | 4.6 | 4.5 |
| EWO-Schwerspat (barium sulfate) | 11.7 | 12.2 | 11.0 | 10.8 | 11.0 | 11.7 | 11.5 |
| magnesium silicate | 7.2 | 7.8 | 6.9 | 6.8 | 7.0 | 7.4 | 7.3 |
| xylol | 23.4 | 18.0 | 16.5 | 21.5 | 19.1 | 17.9 | 18.5 |
| ethylene glycol | 5.2 | 5.0 | 5.0 | 5.0 | 4.6 | 4.5 | 4.6 |
| cobaltiferous siccative (drying oil) | 1.1 | 1.0 | 1.0 | 1.0 | 1.0 | 1.0 | 1.2 |
| | 100.0 | 100.0 | 100.0 | 100.0 | 100.0 | 100.0 | 100.0 |
| PVK in % | 40.4 | 39.4 | 39.3 | 40.8 | 34.0 | 35.8 | 35.4 |
| BWZ after being subjected to 300 hours of salt spray treatment DIN 50021 | 80 | 25 | 25 | 55 | 70 | 75 | 75 |
| BWZ after being subjected to 10 cycles of the Kesternich test DIN 50018 1.0S | — | 20 | 50 | 50 | 40 | 65 | 70 | 70 |

Corresponding improvements were also obtained in primers based on epoxide esters.

We claim:

1. A method for the manufacture of aluminum zinc phosphate hydrates or basic aluminum zinc phosphate hydrates comprising reacting 1 mole of aluminum hydrogen phosphate with 2.4 to 4 moles of zinc oxide and, thereafter, recovering the aluminum zinc phosphate hydrates or basic aluminum zinc phosphate hydrates.

2. A method in accordance with claim 1 wherein the aluminum hydrogen phosphate is a 50% by weight solution of acidic aluminum hydrogen phosphate.

3. A method in accordance with one of the claims 1 or 2 wherein the reaction is carried out at an elevated temperature of 30° C. to 80° C.

4. A method in accordance with claim 3 wherein the reaction is carried out at a temperature of approximately 50° C.

5. A method in accordance with claim 1 further comprising the step of neutralizing excess acidic aluminum hydrogen phosphate with an alkali aluminate.

6. A method in accordance with claim 1 wherein the proportion of $AlPO_4$ and of alumina hydrate, respectively, is increased in dependence on the quantities of zinc oxide and aluminum hydrogen phosphate by adding alkali aluminate or alkali hydroxide, respectively.

7. A method in accordance with claim 1 wherein the 1 mole of aluminum hydrogen phosphate is reacted with 3.15 to 3.50 moles of zinc oxide.

8. A method in accordance with claim 5 wherein the alkali aluminate is sodium aluminate.

9. A method in accordance with claim 1 wherein excess acidic aluminum hydrogen phosphate is neutralized by adding an alkali hydroxide.

10. A method in accordance with claim 9 wherein the alkali hydroxide is sodium hydroxide.

11. A method in accordance with claim 1 wherein less than 3 moles of zind oxide are used per mole of aluminum hydrogen phosphate, and further comprising the step of adding an alkali aluminate in a quantity of up to 0.5 moles, or the equivalent quantity of an alkali hydroxide.

* * * * *